United States Patent [19]

Appel

[11] Patent Number: 5,134,668
[45] Date of Patent: Jul. 28, 1992

[54] MASKED COMBINATIONS OF VIDEO SLICES FOR COMPUTER DISPLAY

[75] Inventor: Arthur Appel, Yorktown Heights, N.Y.

[73] Assignee: International Business Machines Corporation, Armonk, N.Y.

[21] Appl. No.: 477,275

[22] Filed: Feb. 8, 1990

[51] Int. Cl.⁵ .................................................. G06K 9/38
[52] U.S. Cl. .................................... 382/50; 358/455; 358/465
[58] Field of Search ............... 382/50; 358/455–458, 358/465–466

[56] References Cited

U.S. PATENT DOCUMENTS

| | | | |
|---|---|---|---|
| 3,104,372 | 9/1963 | Rabinow et al. | 340/146.3 |
| 4,675,909 | 6/1987 | Egami et al. | 382/50 |
| 4,975,786 | 12/1990 | Katayama et al. | 358/459 |

FOREIGN PATENT DOCUMENTS

| | | | |
|---|---|---|---|
| 0082117 | 7/1978 | Japan | 358/465 |
| 0015370 | 1/1983 | Japan | 358/457 |
| 0048670 | 3/1985 | Japan | 358/457 |

Primary Examiner—Michael Razavi
Assistant Examiner—Andrew W. Johns
Attorney, Agent, or Firm—Scully, Scott, Murphy & Presser

[57] ABSTRACT

A method and system of image processing which utilizes masked video slices to show grey scale images on a bilevel output device. A plurality of video slices of an image are formed by a binary thresholding technique, with each slice displaying the image at different levels of intensity. The same number of video masks are also formed which each comprise a unique pattern of on and off pixels. Each of the video masks is ANDed with a corresponding one of the images slices to create a plurality of masked video slices. The masked video slices are combined to create a binary grey scale image of the original image that can be displayed on a bilevel output device.

47 Claims, 7 Drawing Sheets

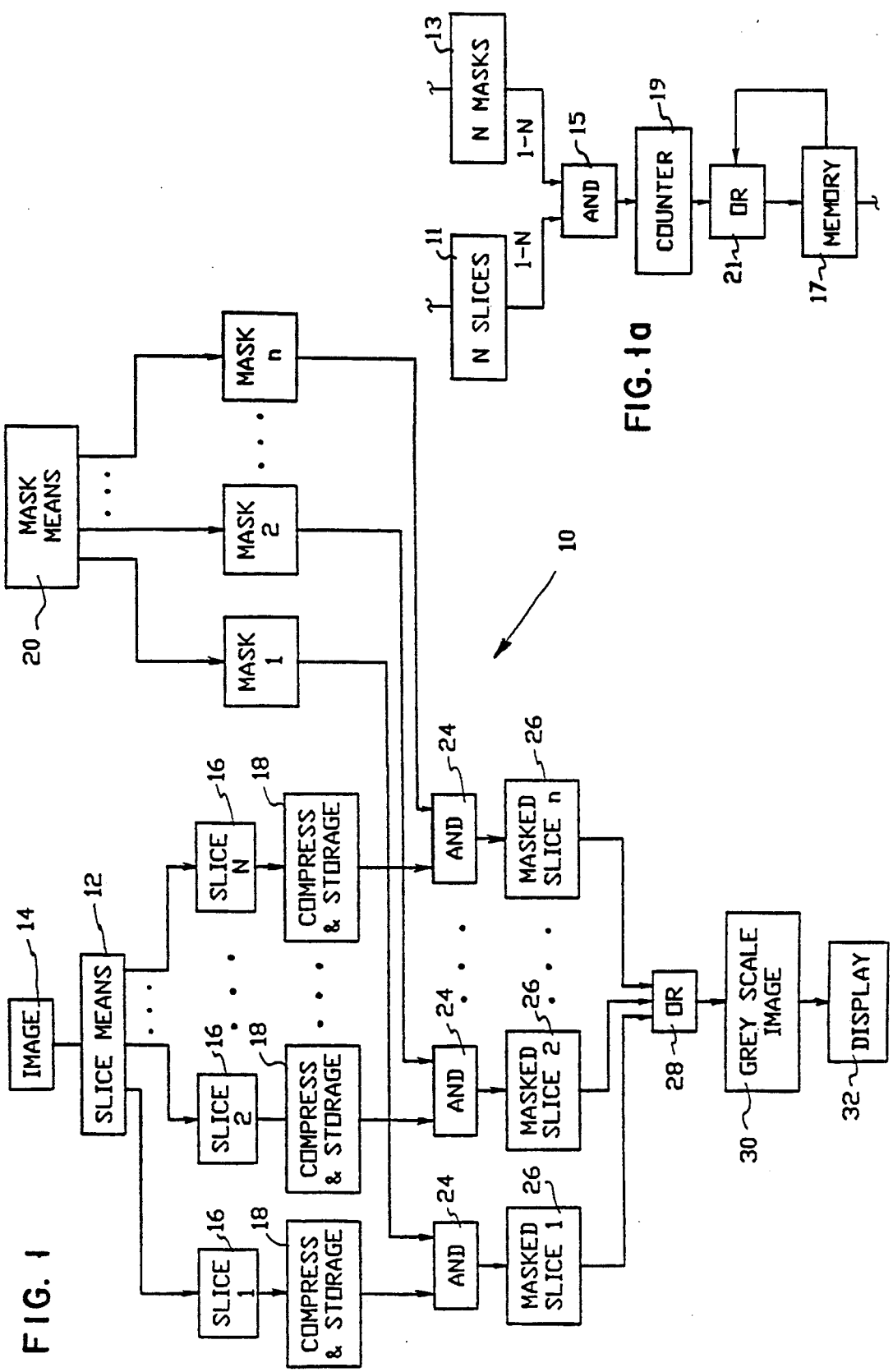

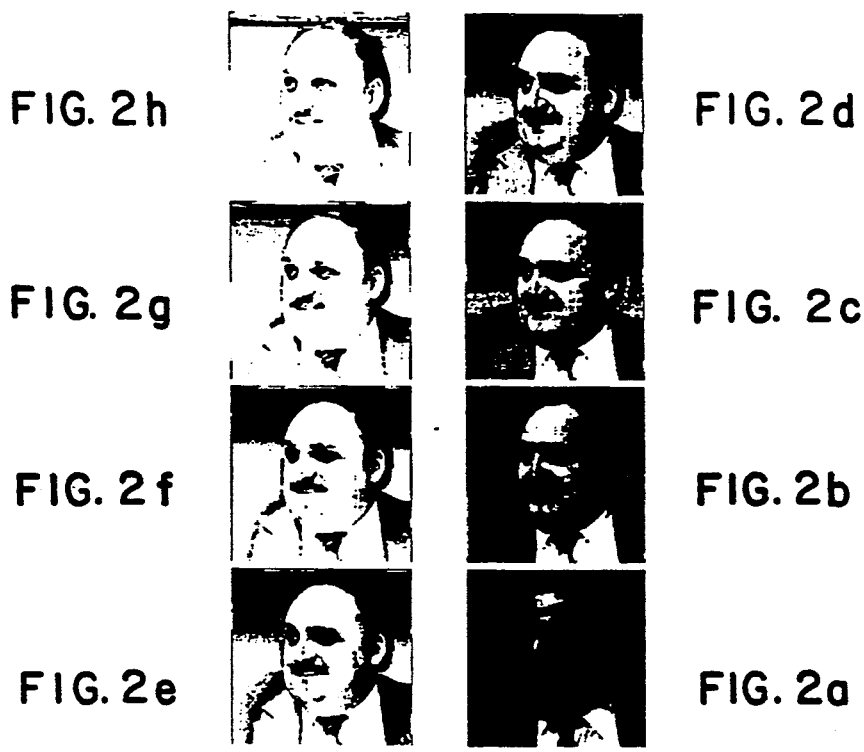
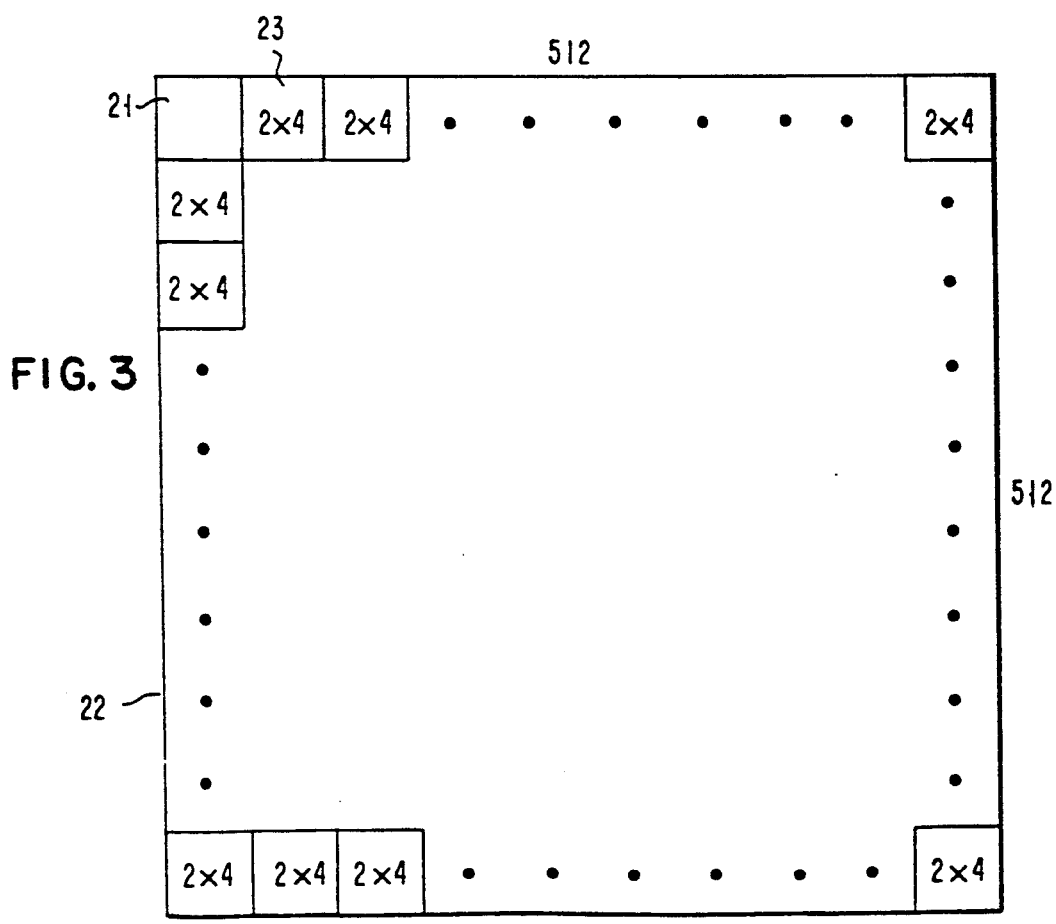

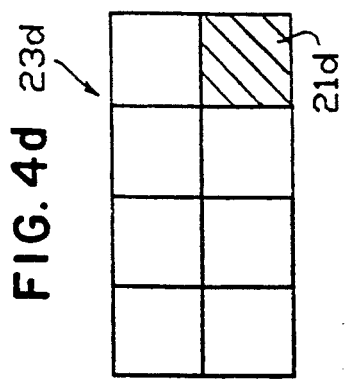
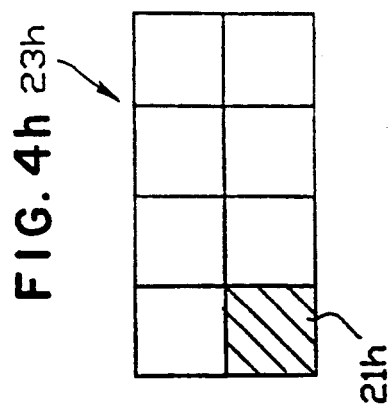
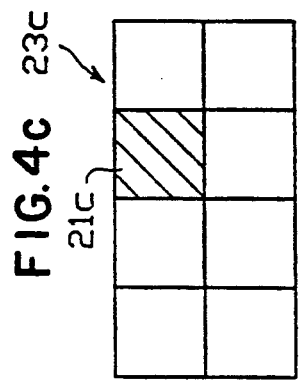
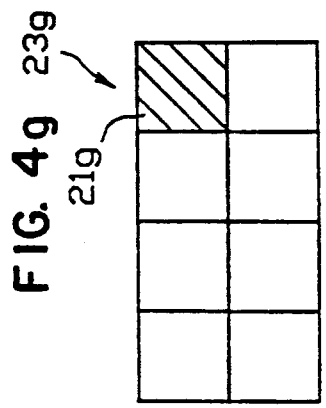
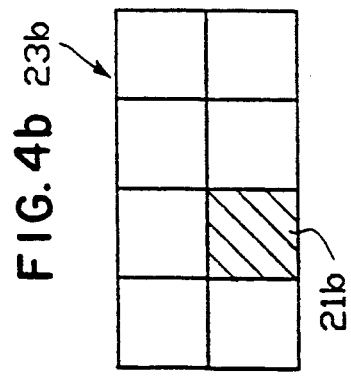
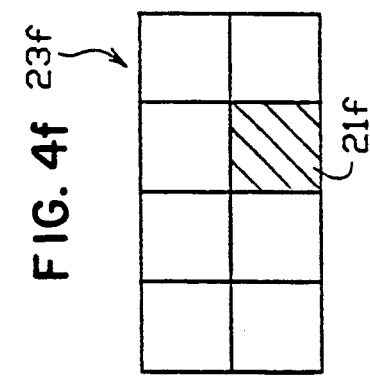
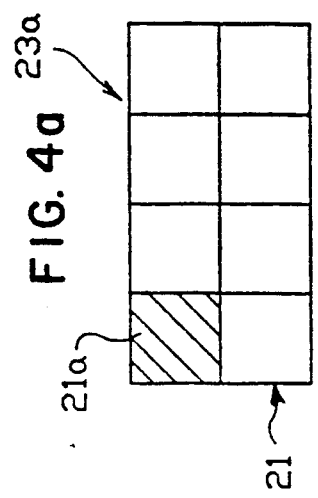
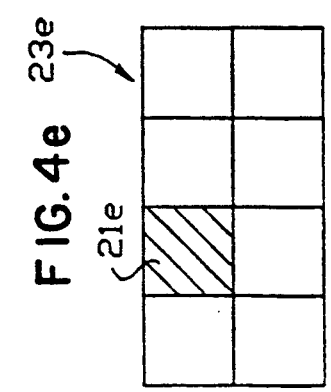

FIG. 10

```
10 KEY OFF:GOSUB 300:SCREEN 2: DIM C(3000),D(3000)
20 CLS: FOR I = 10 TO 350 STEP 4: LINE(I,10)-(I,199),3
   :LINE(I+1,10)-(I+1,199),3: LINE(I+2,10)-(I+2,199),3: NEXT I
22 FOR J = 10 TO 199 STEP 2: LINE(10,J)-(350,J),3: NEXT J
24 GET(10,10)-(350,199),C
25 PUT(10,10),C,PRESET
26 GET(10,10)-(350,198),C
30 DEF SEG=&HB800:BLOAD "plag1.pic",0
31 PUT(13,11),C,AND: GET(10,10)-(350,199),D
32 DEF SEG=&HB800:BLOAD "plag2.pic",0
33 PUT(12,10),C,AND:PUT(10,10),D,OR:GET(10,10)-(350,199),D
35 DEF SEG=&HB800:BLOAD "plag3.pic",0
36 PUT(10,11),C,AND:PUT(10,10),D,OR:GET(10,10)-(350,199),D
37 DEF SEG=&HB800:BLOAD "plag4.pic",0
38 PUT(12,11),C,AND:PUT(10,10),D,OR:GET(10,10)-(350,199),D
40 DEF SEG=&HB800:BLOAD "plag5.pic",0
41 PUT(13,10),C,AND:PUT(10,10),D,OR:GET(10,10)-(350,199),D
42 DEF SEG=&HB800:BLOAD "plag6.pic",0
43 PUT(11,10),C,AND:PUT(10,10),D,OR:GET(10,10)-(350,199),D
45 DEF SEG=&HB800:BLOAD "plag7.pic",0
46 PUT(10,10),C,AND:PUT(10,10),D,OR:GET(10,10)-(350,199),D
47 DEF SEG=&HB800:BLOAD "plag8.pic",0
48 PUT(11,11),C,AND:PUT(10,10),D,OR:GET(10,10)-(350,199),D
60 BEEP
70 K$=INKEY$: IF K$="" THEN 70
80 GOSUB 200
90 LIST -99:    END
200 'THIS SUBROUTINE SWITCHES TO THE IBM MONITOR
210 'THE SCREEN WILL BE CLEAR, AND IN 80 CHARACTER MODE.
220 DEF SEG=0: A=PEEK(&H410): POKE &H410,A OR &H30:DEF SEG
230 SCREEN 1:SCREEN 0:WIDTH 80:LOCATE ,,1,12,13
240 RETURN
300 '
310 'THIS SUBROUTINE SWITCHES TO THE COLOR MONITOR
320 'THE SCREEN WILL BE CLEAR, AND IN 40 CHARACTER TEXT MODE.
330   LOCATE ,,0:DEF SEG=0: A=PEEK(&H410): POKE &H410,(A AND &HCF) OR &H20
340   CLS:WIDTH 40: SCREEN 0: LOCATE ,,1,6,7:DEF SEG:RETURN
```

MASKED COMBINATIONS OF VIDEO SLICES FOR COMPUTER DISPLAY

BACKGROUND OF THE INVENTION

1. Field of the Invention

The present invention relates to image processing methods and systems for converting grey scale images into binary images and more particularly, to combining binary image slices with unique masks to improve the display of grey scale images on binary output devices.

2. Description of the Prior Art

Many data output devices display information in a binary format, i.e., the data is represented as black (off) or white (on) picture elements (pixels). Such devices include printers, computer displays, and facsimile machines. The display of binary data e.g. characters and lines, is compatible with the binary output devices and presents no problems in their display. A problem arises when it is necessary to display a grey scale image such as a photograph on a binary output device. A grey scale image contains continuous tone or halftone regions of various shades of grey rather than being black or white. Devices having the capability of displaying grey scale images can display at each pixel a range of intensity levels, usually from 0 to 256, which is normally determined by eight bits or one byte of computer memory. A binary output device can only display at each pixel one of two intensity levels which is determined by a single bit of memory per pixel. Thus, the difficulty is displaying the various shades of grey on a device having the capability of displaying only black or white pixels.

In order to display the grey scale image on a binary output device, the image must be converted to one bit per pixel. Several techniques have been developed in the prior art to perform this conversion. In one technique, known as thresholding, a binary video slice is made from the image based on the relationship of the intensity level of each pixel of the image to a predetermined threshold intensity level. A slice pixel will be turned on or made white if the value of the light intensity at a corresponding pixel location in the original image is above a certain value. Similarly, a slice pixel will be turned off or made black if the value of the light intensity at the corresponding pixel location is below the threshold value. This basic thresholding technique fails to satisfactorily display the continuous tones of the original grey scale image. U.S. Pat. No. 4,672,682 to Naruse et al. discloses a method for improving the basic threshold technique by successively increasing the slice threshold levels and determining the optimal threshold for displaying each pixel in a video scanning device to correct for temperature changes and other light reducing effects during the scanning operation.

Another method for converting grey scale images to binary is known as the dithering technique. In this technique, a group of pixels are selected to form a local grey spot corresponding to the intensity of an original grey scale image pixel. The number of pixels in the grey spot set to white are proportional to the grey scale value. Many strategies have been developed to improve the smoothness and sharpness of a dithered image. U.S. Pat. No. 4,517,606 to Yokomizo et al. is directed to a method which utilizes two separate dither patterns, one for characters and one for images with halftone. Different threshold levels are selected for each of the patterns. U.S. Pat. No. 4,709,274 to Tioka is directed to an improvement of the two dither pattern technique which utilizes AND and OR operations to improve the selection between the non-halftone areas and the halftone areas of the original image for producing the binary grey scale image. The generation or calculation of the dither patterns to approximate the original grey scale levels requires programs that take considerable time to run and are prone to several classic subjective errors such as worms, staircasing or quantitative residue.

Another technique for improving the dithering method is error diffusion in which the error in the approximation of the grey scale level by the calculation of grey spots can be spread over several neighboring pixels. Error diffusion blends regional grey scale and minimizes unnatural contouring, however, unwanted effects still result such as worms or harmonic patterns in display values. A description of the error diffusion technique can be found in an article by Floyd et al., Proc. S.I.D. Vol. 17(1976). Furthermore, a review of various methods for displaying grey scale images on binary devices can be found in an article by Jarvis, et al. CGIB 5(1976).

In addition, it is also necessary in certain applications to compress the original continuous tone image as it is displayed on the binary output device. Grey scale images are classically difficult to compress while binary images are more easily compressed as taught by Knowlton, IEEE Proc. 68(1980).

SUMMARY OF THE INVENTION

The present invention is directed to a method and system of image processing which utilizes masked video slices to show grey scale images on a bilevel output device. In the first step of the method of the invention, N video slices of an image are formed by a binary thresholding technique. The threshold used to form each slice is at a different intensity level so that each of the N slices display the image at different levels of intensity from a brightest level to a dimmest level. The particular threshold level for each slice should be selected to provide the most overall final picture information. In accordance with the method of the invention, N video masks are also formed which comprise one of N predetermined patterns of on and off pixels. The on pixels in each of the patterns is selected to correspond to pixels of the image. Preferably, if each of the on pixels of all of the N masks were combined in a single matrix, the entire image would be displayed. Each of the N video masks is ANDed with a corresponding one of the image slices to create N masked video slices. Each of the masked video slices is combined with each other to create a grey scale image of the original image that can be displayed on a binary output device.

The thresholded video slices may be formed by the processing of an image that has been digitized and stored in computer memory or by known optical scanning devices. With these techniques, optimum threshold levels may be obtained by histogram equalization. Alternatively, the video slices may be generated in real time by a video digitizing scanner in which the threshold levels are obtained by adjusting the video camera lens. In this embodiment, optimum video slices may be automatically obtained by recursive scanning until the set of video slices are obtained that have the most uniform differences between each video slice. When using a scanner, the slices would be directly stored in memory from the video scanning device.

The video masks are a grid or matrix of pixels matching in number and size the matrix of pixels that form the video slices. The masks are comprised of N repeating sub-patterns of pixels in which each of the sub-patterns comprises a group of continuous pixels, preferably N pixels. Each of the sub-patterns of pixels has a unique arrangement of on and off pixels. Each of the sub-patterns is selected such that if all the patterns were logically ANDed, the original image would be displayed without grey scale. By logically ANDing in this document, it is meant that a pixel will be displayed or turned on in an output image only when the corresponding pixel is displayed in both of the video grids being ANDed. By logically ORed, a pixel will be turned on when one or both of the grids being combined has the corresponding pixel in an on state. Thus, when all the masks are logically ORed, the entire image will be displayed. Each of the video masks are also stored in memory.

The N video slices and the N video masks are combined in a logical ANDing process to form N masked video slices. In accordance with the above definition of logical ANDing, the masked slices will only display on pixels when corresponding pixels in both the mask and the slice are on. The masked video slices are stored in memory and are then successively combined by a logical ORing process to form a single grey scale image. The grey scale image can then be displayed on a binary output device.

The method of the present invention utilizes easily recorded video slices and combines the slices with simple and easily formed video masks to form a grey scale image that can be displayed on a binary output device. In addition to the speed of generating the image, the invention is flexible in that the shape of the masked patterns may take any form and be selected for any desired results. In addition, compression of the data is facilitated since the video slices are binary in nature which can be easily compressed by known techniques. The method of the invention provides benefits in various areas of image acquisition and transmission in which images are displayed on binary output devices without the problems associated with prior art methods.

BRIEF DESCRIPTION OF THE DRAWINGS

FIG. 1 is a block diagram of the image processing system of the present invention.

FIG. 1a is a partial block diagram of an alternate image processing system of the present invention.

FIGS. 2a-2h are examples of thresholded video slices each formed at a different threshold level.

FIG. 3 is a diagram of a memory array for forming the video masks.

FIGS. 4a-4h are diagrams of one sequence of pixel sub-patterns for forming eight video masks.

FIG. 10 is a partial listing of a program written in BASIC for implementing the method of the present invention.

DETAILED DESCRIPTION OF THE INVENTION

Figure 5:
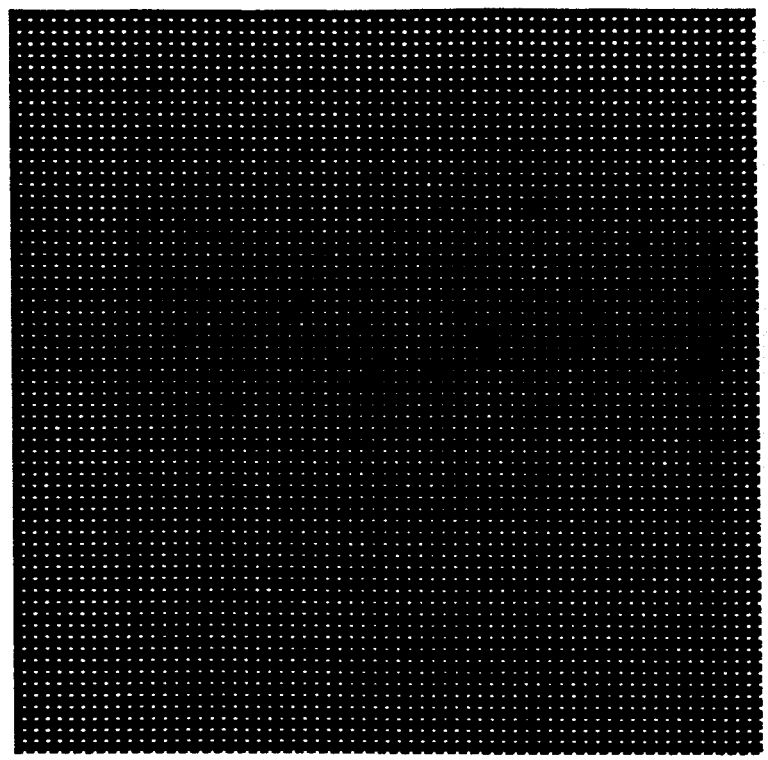
FIG. 5 depicts an actual mask having a rectangular shaped sub-pattern of pixels.

The image processing system of the present invention for displaying a grey scale image on a binary output device is illustrated in FIG. 1. The image processing system 10 includes means 12 for generating a plurality of video slices of an image 14 by thresholding. In the thresholding process, the comparison of the light intensity of a particular point on the image is compared to a threshold light intensity and based upon this comparison, the corresponding pixel and the slice is made either black or white. Typically, if the light intensity at the particular location is greater than the threshold level, the pixel and the slice will be made white and if the light intensity at the location is less than the threshold level, the pixel will be made black.

In one embodiment, the image 14 is contained on a photographic or other media that exhibits the image with various shades of grey. The slice generating means 12 may be comprised of conventional, optical and digital processing components well known in the art for creating video slices at a predetermined threshold intensity level. In a conventional slice generating system, the photographic or other media is illuminated by a light beam and the reflective light beam is converted to an electrical signal. The signal is compared to a threshold value to determine whether the corresponding slice pixel will be black or white. The image is fully scanned in this manner until the binary slice is completed.

Alternatively, the original grey scale image to be thresholded may be an image that has been digitized and stored in memory, so that the various intensity levels of each pixel are represented by a numerical value. The digital value of each pixel is compared to a digital threshold value to determine whether the pixel will be on or off.

The means 12 of the present invention generates a plurality of video slices of the same image. Each slice is generated at one of a plurality of threshold levels and stored in memory. As shown in FIG. 1, N video slices 16 are generated and correspondingly stored in N different locations in memory. The threshold levels may be selected manually or by software controlling the system used to create the slices.

In another embodiment, the slice generating means 12 may be a video digitizing scanner that can generate the slices in real time from a video camera, such as a television camera. The various threshold slice levels in a video digitizing scanner system can be selected by manually adjusting the camera F-stop setting of the camera lens or by adjusting the digitizing intensity threshold automatically by the software controlling the system. A commercially available scanning system is the FG-100-AT system from Imaging Technology Incorporated. Video digitizing scanners such as the FG-100-AT system takes a video input signal, digitizes the signal and enters it in computer memory for display on a digital output device. Thus, a video digitizing scanner can be used to create the plurality of video slices 16 having different intensity levels in real time.

Referring to FIG. 2a through 2h, there is shown examples of eight video slices of an image. For illustrative purposes only, assuming that the original image contained grey scale intensity levels from 0 to 256, the threshold levels of the various slices are as follows: FIG. 2a, threshold level of 30; FIG. 2b, threshold level of 60; FIG. 2c, threshold level of 90; FIG. 2d, threshold level of 120; FIG. 2e, threshold level of 150; FIG. 2f, threshold level of 180; FIG. 2g, threshold level of 210; and FIG. 2h, threshold level of 240. As can be seen, as the threshold level is successively increased from 30 to 240, fewer of the pixels satisfy the requirement of being above the threshold level and hence the video slices created are successively brighter to dimmer. It should be understood that the images shown in FIGS. 2a-2h are depicted by the dark lines, while in actuality, the image as normally displayed on a display screen, the background is dark and the image lines are white.

Typically, eight video slices will provide sufficient resolution for a good quality picture, however, any number of slices may be created, although it has been determined that at least four slices will normally be necessary to provide a minimum quality display.

The example of threshold levels described above has equally spaced levels. It should be understood that this is just one example and that other threshold spacings may be appropriate for different applications including randomly selected threshold levels. Moreover, it has been determined that where the original image is either abnormally light or abnormally dark, equally spaced threshold levels would not be preferred. A lack of difference in the video slices would lead to a contrast problem and thus there is a need to be able to pick nonequally spaced threshold and intensity values in this situation. A particularly useful procedure is to choose threshold levels that are selected by histogram equalization. An example of the use of histogram equilization can be found in Pavlidis, Algorithms for Graphics and Image Processing, Computer Science Press, pp.50-53 (1982). Basically, the process of histogram equalization involves reassigning the available levels of quantization so that the dynamic range of the image increases. Optimum video slices may be automatically obtained when using a video digitizing scanner by using recursive scanning until the set of video slices are created that have the most uniform differences between each video slice.

The video slices generated in this invention are binary in format and are stored in a one bit per pixel mode. Typically, the original video input images contain one byte of information per pixel. Prior to converting a byte per pixel image to a bit per pixel image, it is usual practice to enhance the original image by increasing the local difference and intensity of pixels and also increasing the range of pixel values over the entire image. The former process is called high pass filtering while the latter process is called rearranging. Either of these two processes may optionally be used in the method and system of the present invention to compensate for any apparent loss of resolution.

A further optional process that may be performed within the method of the present invention is the compression of the video slice images. In addition to converting the video input image from a byte per pixel to a bit per pixel image, is also often necessary to compress the image to a smaller number of pixels. Image compression is a well known technique which may be performed by run length encoding or other known methods. Because the video slices are binary in nature, they are much easier to compress than grey scale images. Known compression techniques are described by Knowlton, Proc. IEEE. 68(7) 1980, incorporated herein by reference. Compression can be performed by known digital processing systems or software. As shown in FIG. 1, compression means 18 compresses the slices 16 and restores each compressed slice its memory location.

In accordance with the present invention, in addition to creating N video image slices, a corresponding number of video masks must also be created. As shown in FIG. 1, the mask generating means 20 creates N video masks which are also stored in separate locations in the memory of the system 10. Each of the masks 22 consist of a grid of pixels identical in number to the number of pixels forming each of the video slices. An example of a grid is shown in FIG. 3 which contains $512 \times 512$ pixels 21. A mask is created by providing the grid with a predetermined pattern of on and off pixels. Each of the N masks 22 has a unique pattern different from each of the other masks. Typically, the patterns are formed by repeating sub-patterns of contiguous pixels. In the illustrative embodiment shown in FIG. 3, the sub-patterns 23 of pixels consist of a rectangularly shaped group of pixels of two vertically spaced and four horizontally spaced pixels. In forming the sub-patterns 23 of on and off pixels, a predetermined number of pixels in each sub-pattern 23 will be on and a predetermined number will be off. Each of the sub-patterns 23 are preferably selected so that each individual pixel in the group is on in only one mask so that there are no overlapping pixels in any of the masks. An example of such an arrangement is shown in FIGS. 4a-4h which shows a different pixel 21 turned on in each group 23. In FIGS. 4a-4h, the cross-hatching indicates that pixel is in the on state while the remaining pixels in the group are in the off state. Thus, in FIG. 4a, only pixel 21a is on, in FIG. 4b only pixel 21b is on, etc. Hence, a first mask, formed in the manner of the grid of FIG. 3 will have each of the pixel groups 23 identical in configuration to FIG. 4a. A second mask will have each of the pixel groups 23 identical in figuration to FIG. 4b. The remaining masks up to the eighth mask will have the configurations of pixels as shown in FIGS. 4c, 4d, 4e, 4f, 4g and 4h, respectively. An example of a large area of a full mask having one of the configurations of FIGS. 4a-4h is shown in FIG. 5.

Figure 6:
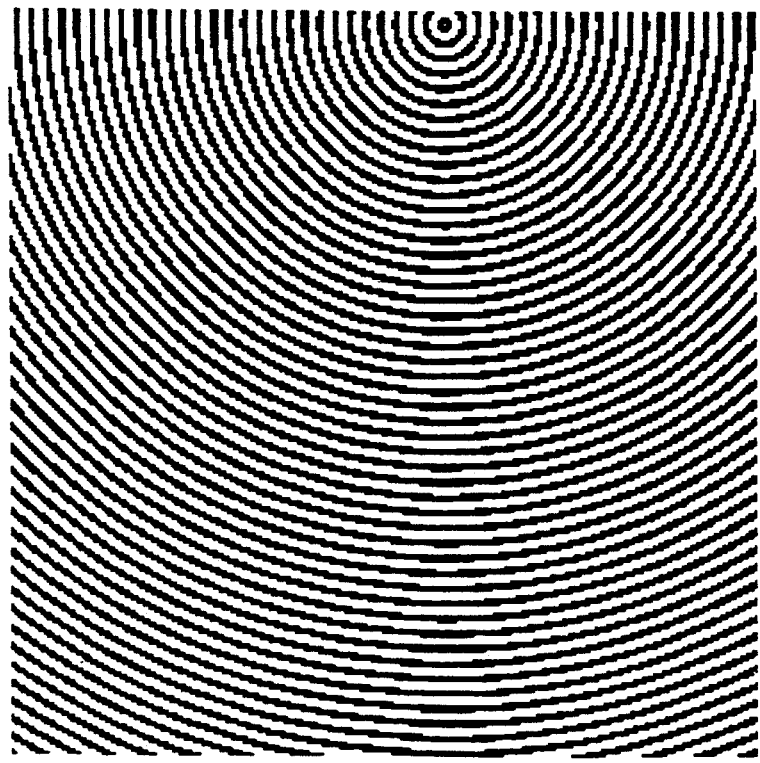
FIG. 6 depicts an actual mask having an overall circular shaped pattern of pixels.

The shape of the masks and the sub-patterns is not critical. In addition to rectangular, the sub-patterns of pixels may be square, circular or any other shape. The pattern of on and off pixels is also subjective and may be selected or adjusted to create various effects in the resulting image. For example, the overall mask may be a particular shape, design or other configuration as desired. FIG. 6 is one example of a circular shaped overall mask design. Each mask for the various slices in this design would have different diameters for the circular patterns of on pixels. Any configuration can be used whatsoever, the only requirement is that there be a unique mask for each of the slices.

The N video slices that are created and stored and the N video masks that are created and stored, are combined to create N masked video slices. The combining of the masks and slices is by a logical ANDing process performed by means 24 which may be implemented by conventional digital processing or by software. Each of the N slices is combined with one of the N masks by the combining means 24 to provide N masked video slices 26. In the logical ANDing process, each pixel of the slice is ANDed with a corresponding pixel in the mask and the masked video slice will display an on pixel only when the corresponding pixels in both the slice and the mask is in the on state. As shown in FIG. 1, video slice 1 is combined with mask 1 to provide masked slice 1.

This process continues for slices 2 through N. The masked video slices 26 are stored in memory and combined by combining means 28 to provide a resulting grey scale image 30 suitable for display on a binary output display means 32.

The combining means 28 performs a logical ORing process to sequentially combine each of the N masked slices. The means 28 may also be implemented by conventional digital processing or software. In one embodiment of the ORing process, all of the masked slices are formed and stored in memory. Thereafter, masked slice 1 is combined with masked slice 2 to provide a first intermediate image having pixels in the on state in which the corresponding pixel in either mask 1 or mask 2 is in an on state. Masked slice 3 is then combined with the first intermediate image in a similar ORing process to form a second intermediate image. Each of the masked slices are sequentially combined in a similar manner until all of the N masked slices have been combined to form the final image.

In an alternative embodiment as shown in FIG. 1a, the N slices are stored in N locations in memory 11 and the N masks are stored in N locations in memory 13. The first slice and mask are then combined in ANDing means 15 and is stored in image storage 17 as the first intermediate image. Each ith slice is thereafter combined with the corresponding ith mask after the (i-1)th masked slice has been combined in OR means 21 with the (i-1)th intermediate image to form the ith intermediate image stored in memory 17. A counter 19 keeps count of the number of masked slices created. Each subsequent masked slice is ORed with the previously stored intermediate image before being stored, until the final grey scale image is created.

In another embodiment, the N slices are created and stored in N locations in memory 11. Each mask, when created, is directly combined with a corresponding slice in combining means 15. The masked slices are then counted in counter 19, combined in means 21 and stored in means 17 as described above.

Figure 7:
FIG. 7 depicts an actual grey scale image displayed on a binary output device using masks as shown in FIG. 5.
Figure 8:
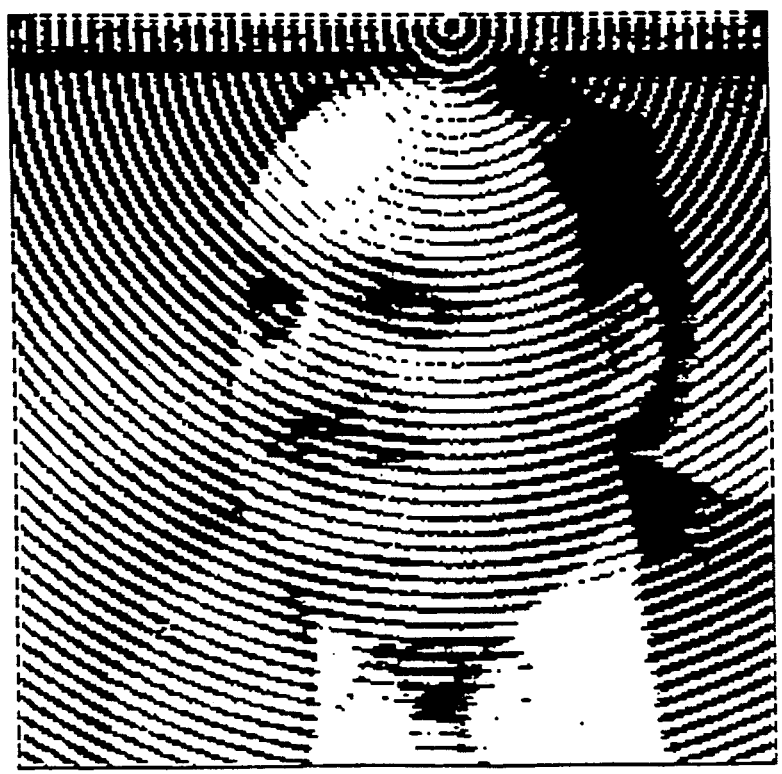
FIG. 8 depicts an actual grey scale image displayed on a binary output device using masks as shown in FIG. 6.

A typical grey scale image 30 created in accordance with the present invention is shown in FIG. 7 as it would be displayed on a binary display device 32. The image of FIG. 7 was produced by creating and combining 16 slices of an original photograph, using a 4×4 pixel sub-pattern. FIG. 8 is a typical grey scale image created with 8 slices combined with circular pattern masks as in FIG. 6.

Figure 9:
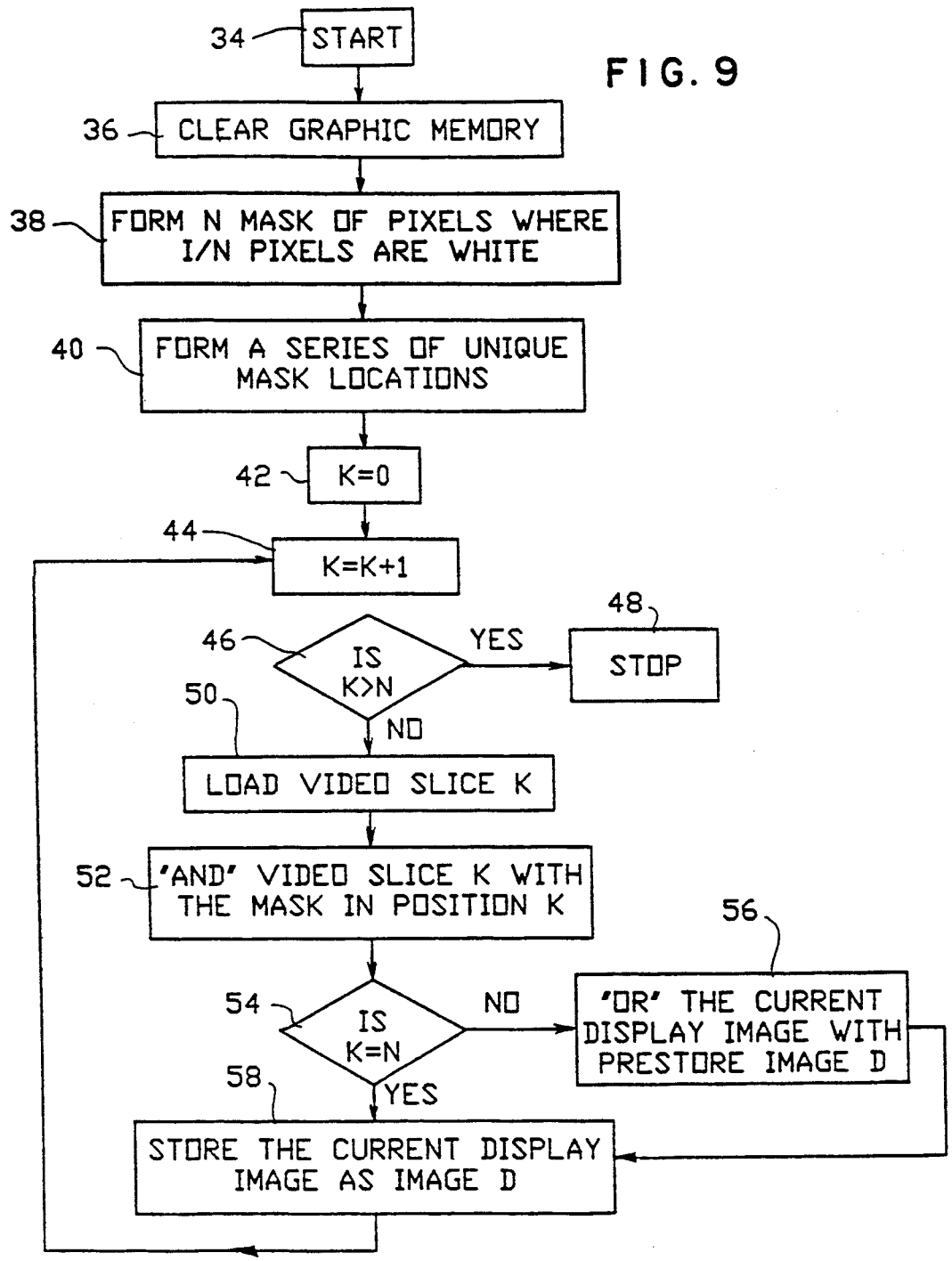
FIG. 9 is a flow chart of the method of the present invention.

Referring now to FIG. 9, there is shown a flow diagram of the operations described above for FIG. 1 for the system 10 implemented in software. For the purposes of this flow diagram, it is assumed that the video image slices have already been created and stored in memory. In accordance with the method, the start module 34 is implemented which causes the first operation in the process, represented by block 36, to be executed to clear the graphic memory for utilization in the present method. In the second operation, represented by block 38 in the flow chart, the N masks are created in accordance with the desired sub-pattern of pixels. In the next operation, represented by block 40, the N masks created in the previous step are loaded or moved to a set of predetermined memory locations so they can be recalled and utilized. In the next operation, represented by block 42, a variable K is initialized which is used as a counter variable to keep track of the number of slices combined with a mask. In the next operation, represented by block 44, the counter variable K is incremented by one. The next block 46 is a decision module which represents the determination of whether the number of video image slices exceeds the number of masks. If K is greater than N, the program is complete and stop module 48 terminates the program. If the number of slices does not exceed the number of masks, then the program continues to run. In the next operation represented by block 50, a particular video image slice, as determined by the counter variable K, is loaded into a particular memory area. In the next operation represented by block 52 the particular mask is ANDed with its corresponding video image slice. The next block 54 is a second decision module which represents the determination of whether the number of masks is equal to the number of video image slices. If K is not equal to N, the current or intermediate display image created by the ANDing step 52, is ORed with the previously stored image, stored by block 56. The current image is then stored by block 58. As long as the number of masks does not equal the number of video image slices, the ANDing and ORing continues in a loop defined by blocks 44, 46, 50, 52, 54, 56 and 58. When the number of masks equals the number of video image slices the current image stored by block 58 is the final image. Then, at decision block 46 K will be equal to N and the program will stop.

FIG. 10 contains a partial listing of one illustrative software program used to implement the procedure given in the flow chart of FIG. 9. The program is written in BASICA to run on a personal computer. The program runs very fast since it consists only of a series of BLOADS, GETS and PUTS, all operations that would be very fast even if implemented in hardware or other programming languages.

The partial listing of FIG. 10 is designed for IBM Personal Computer Displays, such as Color Graphic Adaptor and Display, Enhanced Graphic Adaptor and Display, Hercules Graphic Adaptor or Video Graphic Array.

The following are definitions of certain bitmapping commands to aid in the understanding of the program listing.

GET($X_1$, $Y_1$)–($X_2$, $Y_2$), C (step 24) means to take the subimage in the rectangle between ($X_1$, $Y_1$) to ($X_2$, $Y_2$) and save it in variable array C.

Put (X, Y), C, HOW, means to redraw the image stored in variable array C starting at location X, Y in the manner described by HOW. HOW can mean one of the following:

PRESET—When drawing the image, reverse black and white.

PSET—Redraw the image the same as it was stored.

AND—Redraw the image in AND mode, that is, turn a pixel on (set to white) only if the pixel is already white, otherwise the pixel remains black.

OR—Redraw the image in OR mode, that is, if a pixel in the image stored in variable array C is on (set to white), redraw it as white. If the previous pixel is white and the screen is white, leave it white. This is one method to add an image to another image.

DEF SEG=&HB800: BLOAD "FILENAME", O, means to take the image stored under FILENAME and load it into graphic memory. The screen will now be only this new image.

SCREEN 2 means to set the display in a 640×200 black and white mode.

SUB 200 means to draw only on a monochrome display.

SUB 300 means to draw only on a color graphic display. The latter two steps are valid only on two screen systems.

LINE (X,Y)-(U,V), 3, means to draw a white line X, Y to U, V. Typically LINE (10,J)-(352,J),3 is a horizontal line. LINE (I,10)-(I-199), 3 is vertical.

In the program listing shown in FIG. 10, the result of statements 10 through 25 is to draw a matrix of dots of 190×341 which forms the masks. Statement 26 saves this matrix of dots as sub-picture C. Statement 30 loads a previously stored video slice. Statement 31 ANDs this slice with the matrix of dots (the mask) and saves the result in sub-picture D.

Statement 32 loads another previously stored video slice. Statement 33 ANDs this slice with the mask in a different position (note the new location of the start position), adds the result to the previous sub-picture D and saves the result as a new sub-picture D. Subsequent statements repeat this simple cycle of ANDing video slices with new positions of the mask and adding the results to the sub-picture D. This program will result in the display of grey scale images similar to the image shown in FIG. 7.

While the invention has been particularly shown and described with respect to the preferred embodiments thereof, it should be understood by those skilled in the art that the foregoing and other changes in form and details may be made therein without departing from the spirit and scope of the invention which should be limited only be the scope of the appended claims.

Having thus described the invention, what is claimed as new, and is desired to be secured by Letters Patent is:

1. An image processing method comprising the steps of:
   thresholding an image N times with N successively greater light intensity values thereby creating N thresholded binary outputs, each thresholded output representing an image slice;
   forming N video masks, each of said masks comprising one of N predetermined patterns of on and off pixels;
   ANDing each of said N video masks with a corresponding one of said N image slices, to create N masked video slices;
   ORing each of said N masked video slices sequentially to create a grey scale image; and
   displaying said grey scale image on a binary output device; wherein N, in all instances, is greater than 1.

2. The method of claim 1 wherein each of said N predetermined pattern of pixels is comprised of a plurality of one of N repeating sub-patterns, each said sub-pattern comprising N contiguous pixels.

3. The method of claim 2 wherein each said sub-pattern of N contiguous pixels includes one on pixel and N-1 off pixels.

4. The method of claim 3 wherein each said sub-pattern of said N sub-patterns has a different on pixel from every other sub-pattern.

5. The method of claim 4 wherein said N contiguous pixels of each said N sub-patterns includes one of a rectangular, square or circular shaped array of pixels.

6. An image processing method for displaying a grey scale image on a binary output device comprising the steps of:
   (a) forming N binary video slices of an image to be displayed, each said video slices having on pixels only corresponding to pixels of the image having an intensity level equal to or above one of N threshold intensity levels, all other pixels of said slice being off;
   (b) storing each of said N binary video slices in memory;
   (c) forming N binary video masks, each said video mask comprising one of N predetermined patterns of on and off pixels;
   (d) storing each of said N binary video masks in memory;
   (e) combining each of said N video slices with a corresponding one of said N video masks to create N masked video slices;
   (f) storing each of said N masked video slices in memory;
   (g) combining said N masked video slices to create a single grey scale image; and
   (h) displaying said single grey scale image on a binary output device;
wherein N, in all instances, is greater than 1.

7. The method of claim 6 wherein said N threshold intensity levels are selected successively from a lowest level to a highest level such that the image displayed by said N binary video slices is successively brightest to dimmest from the 1st to the Nth slice.

8. The method of claim 6 wherein said N binary video slices are created by a video scanner.

9. The method of claim 6 wherein said N binary video slices are created by computer means from a previously stored grey scale image.

10. The method of claim 6 wherein said N threshold intensity levels are selected randomly between 0 and the maximum intensity level of said image.

11. The method of claim 6 wherein said N threshold intensity levels are selected to be equally spaced between 0 and the maximum intensity level of said image.

12. The method of claim 6 wherein said N threshold intensity levels are selected by histogram equalization.

13. The method of claim 6 wherein N is 4 or greater.

14. The method of claim 6 wherein each of said N predetermined patterns of pixels is comprised of a plurality of one of N repeating sub-patterns, each said sub-pattern comprising N continuous pixels.

15. The method of claim 14 wherein each said sub-pattern of N contiguous pixels includes one on pixel and N-1 off pixels.

16. The method of claim 15 wherein each said sub-pattern of said N sub-patterns has a different on pixel from every other sub-pattern.

17. The method of claim 16 wherein said N contiguous pixels of each said N sub-patterns includes a rectangular array of pixels.

18. The method of claim 16 wherein said N contiguous pixels of each said N sub-patterns includes a square array of pixels.

19. The method of claim 16 wherein said N contiguous pixels of each said N sub-patterns includes a circular array of pixels.

20. The method of claim 17 wherein N is equal to 8.

21. The method of claim 6 wherein said step of combining said N video slices with said N video masks includes the steps of logically ANDing each pixel of said slice with a corresponding pixel of said mask, there being a one to one correspondence between said slice and said mask, said masked video slices having an on pixel only where the corresponding pixel on both said slice and said mask is on.

22. The method of claim 6 wherein said step of combining said N masked video slices to create said single grey scale image includes the step of logically ORing corresponding pixels of each said masked slices, there being a one to one correspondence of pixels for each masked slice, said grey scale image having an on pixel where a corresponding pixel of at least one of said masked slices is on.

23. The method of claim 6 further including the step of compressing the image displayed by each said video slice into fewer pixels than the number of pixels in each video slice before compression, said compressing step occurring before each slice is ANDed with said video masks.

24. An image processing system comprising:
means for thresholding an image N times with N sequentially greater light intensity values thereby creating N thresholded binary outputs, each thresholded output representing an image slice;
means for forming N video masks, each of said masks comprising one of N predetermined patterns of one and off pixels;
means for ANDing each of said N video masks with a corresponding one of said N image slices to create N masked video slices;
means for ORing each said N masked vide slices sequentially to create a grey scale image; and
means for displaying said grey scale image on a binary output device;
wherein N, in all instances, is greater than 1.

25. The system of claim 24 wherein each of said N predetermined patterns of pixels is comprised of a plurality of one of N repeating sub-patterns, each said sub-pattern comprising N contiguous pixels.

26. The system of claim 25 wherein said sub-pattern of N contiguous pixels includes one on pixel and N-1 off pixels.

27. The system of claim 26 wherein each said sub-pattern of said N sub-patterns has a different on pixel from every other sub-pattern.

28. The system of claim 27 wherein said N contiguous pixels of each said N sub-patterns includes one of a rectangular, square or circular shaped array pixels.

29. An image processing system for displaying a grey scale image on a binary output device comprising:
(a) means for creating N binary video slices of an image to be displayed, each said video slice displaying pixels of the image having an intensity level equal to or above one of N threshold intensity levels;
(b) means for storing each of said N binary video slices in memory,
(c) means for creating N binary video masks, each said video mask comprising one of N predetermined patterns of on and off pixels;
(d) means for storing each of said N binary video masks in memory;
(e) means for combining each of said N video slices with a corresponding one of said N video masks to create N masked video slices;
(f) means for storing each of said N masked video slices;
(g) means for combining said N masked video slices to create a single grey scale image; and
(h) means for displaying said single grey scale image on a binary output device;
wherein N, in all instances, is greater than 1.

30. The system of claim 29 wherein said N threshold intensity levels are selected successively from a lowest level to a highest level such that the image displayed by said N binary video slices is successively brightest to dimmest from the 1st slice to the Nth slice.

31. The system of claim 29 wherein said N binary video slices are created by a video scanner.

32. The system of claim 29 wherein said N binary video slices are created by computer means.

33. The system of claim 29 wherein said N threshold intensity levels are selected randomly between 0 and the maximum intensity level of said image.

34. The system of claim 29 wherein said N threshold intensity levels are selected to be equally spaced between 0 and the maximum intensity level of said image.

35. The system of claim 29 wherein said N threshold intensity levels are selected by histogram equalization.

36. The system of claim 29 wherein each of said N predetermined patterns of pixels is comprised of a plurality of one of N repeating sub-patterns, each said sub-pattern comprising N contiguous pixels.

37. The system of claim 36 wherein each said sub-pattern of N contiguous pixels includes one on pixel and N-1 off pixels.

38. The system of claim 37 wherein each said sub-pattern of said N sub-patterns has a different on pixel from every other sub-pattern.

39. The system of claim 38 wherein said N contiguous pixels of each said N sub-patterns includes one of a rectangular, square or circular shaped array of pixels.

40. The system of claim 29 wherein said means for combining said N video slices with said N video masks includes logical ANDing means wherein each pixel of said slices is ANDed with a corresponding pixel of said mask, there being a one to one correspondence between said slice and said mask, said masked video slices having an on pixel only where the corresponding pixel in both said slice and said mask is on.

41. The system of claim 29 wherein said means of combining said N masked video slices to create said single grey scale image includes logical ORing means wherein corresponding pixels of each said masked slices are ORed, there being a one to one correspondence of pixels for each masked slice, said grey scale image having an on pixel where a corresponding pixel of at least one of said masked slices is on.

42. The system of claim 29 further including means of compressing the image displayed by each said video slice into fewer pixels than the number of pixels in each video slice before compression, said compression occurring before each slice is ANDed and with said video masks.

43. An image processing method comprising the steps of:
forming a first video mask, said mask comprising a first one of N predetermined patterns of on and off pixels;
ANDing said first video mask with a first image slice, to create a first masked video slice;
storing said first masked video slice in memory;
forming a second video mask comprising a second said one of N predetermined patterns of on and off pixels;
ANDing said second video mask with a second image slice to create a second masked video slice;
ORing said second masked video slice to said stored masked video slice to create a display image;
storing said display image in memory;

repeating said latter forming and ANDing steps N-2 times, each time ORing the masked video slice to the previously stored display image to create a binary grey scale image; and displaying said binary grey scale image on a binary output device;

wherein N, in all instances, is greater than 1.

44. The method of claim 43 wherein each of said N predetermined pattern of pixels is comprised of a plurality of one of N repeating sub-patterns, each said sub-pattern comprising N contiguous pixels.

45. The method of claim 44 wherein each said sub-pattern of N contiguous pixels includes one on pixel and N-1 off pixels.

46. The method of claim 45 wherein each said sub-pattern of said N sub-patterns has a different on pixel from every other sub-pattern.

47. The method of claim 46 wherein said N contiguous pixels of each said N sub-patterns includes one of a rectangular, square or circular shaped array of pixels.

* * * * *